(12) United States Patent
Colaciti et al.

(10) Patent No.: US 9,567,063 B2
(45) Date of Patent: Feb. 14, 2017

(54) AIRFOIL FLAP ASSEMBLY WITH SPLIT FLAP TRACK FAIRING SYSTEM

(71) Applicant: EMBRAER S.A., São José dos Campos (BR)

(72) Inventors: Alysson Kennerly Colaciti, São José dos Campos (BR); Leandro Guilherme Crenite Simões, São José dos Campos (BR); Alexandre Viana Ferreira, São José dos Campos (BR); Micael Gianini Valle do Carmo, São José dos Campos (BR); Mário Triches, Jr., São José dos Campos (BR); Vinicius Losada Gouveia, São José dos Campos (BR)

(73) Assignee: EMBRAER S.A., São José dos Campos—SP (BR)

( * ) Notice: Subject to any disclaimer, the term of this patent is extended or adjusted under 35 U.S.C. 154(b) by 0 days.

(21) Appl. No.: 14/718,324

(22) Filed: May 21, 2015

(65) Prior Publication Data

US 2016/0340023 A1 Nov. 24, 2016

(51) Int. Cl.
*B64C 7/00* (2006.01)
*B64C 9/18* (2006.01)

(52) U.S. Cl.
CPC .. *B64C 7/00* (2013.01); *B64C 9/18* (2013.01)

(58) Field of Classification Search
CPC ............... B64C 7/00; B64C 7/02; B64C 9/16; B64C 9/18; B64C 9/32
See application file for complete search history.

(56) References Cited

U.S. PATENT DOCUMENTS

| | | | | |
|---|---|---|---|---|
| 2,169,416 A | * | 8/1939 | Griswold | B64C 9/16 244/216 |
| 2,542,792 A | * | 2/1951 | Bennett | B64C 9/16 244/216 |
| 2,661,166 A | * | 12/1953 | Gordon | B64C 9/16 244/216 |
| 3,874,617 A | * | 4/1975 | Johnson | B64C 9/20 244/216 |
| 4,172,575 A | * | 10/1979 | Cole | B64C 9/04 244/215 |
| 4,248,395 A | * | 2/1981 | Cole | B64C 9/04 244/216 |

(Continued)

*Primary Examiner* — Tien Dinh
*Assistant Examiner* — Michael A Fabula
(74) *Attorney, Agent, or Firm* — Nixon & Vanderhye P.C.

(57) ABSTRACT

Flap track fairing systems are split into a forward immovably fixed portion and an aft movable portion. The fixed forward portion is immovably attached to the main wing structure of an aircraft while the movable aft portion is attached either to the movable components of the flap deployment mechanism or to the lower surface of the flap. A separation line between the forward movable portion and the aft fixed portion is provided such that the movable portion does not interfere structurally with the flap fairing structure during a flap extension/retraction cycle. An airflow deflector is positioned near a forward separation edge of the aft fairing portion so as to be positioned within a gap defined between the forward edge of the aft fairing portion and a rearward edge of the forward fairing portion when the flap is in the deployed configuration thereof to thereby deflect airflow away from the interior space of the fairing.

21 Claims, 7 Drawing Sheets

(56) References Cited

U.S. PATENT DOCUMENTS

| | | | | |
|---|---|---|---|---|
| 4,283,029 A * | 8/1981 | Rudolph | ............ | B64C 9/16 |
| | | | | 244/207 |
| 4,353,517 A * | 10/1982 | Rudolph | ............ | B64C 9/20 |
| | | | | 244/216 |
| 4,381,093 A * | 4/1983 | Rudolph | ............ | B64C 9/16 |
| | | | | 244/216 |
| 4,434,959 A * | 3/1984 | Rudolph | ............ | B64C 9/16 |
| | | | | 244/212 |
| 4,444,368 A * | 4/1984 | Andrews | ............ | B64C 9/16 |
| | | | | 244/212 |
| 4,448,375 A * | 5/1984 | Herndon | ............ | B64C 9/16 |
| | | | | 244/215 |
| 4,669,687 A * | 6/1987 | Rudolph | ............ | B64C 9/16 |
| | | | | 244/212 |
| RE32,907 E | 4/1989 | Rudolph | | |
| 4,854,528 A * | 8/1989 | Hofrichter | ......... | B64C 9/18 |
| | | | | 244/130 |
| 5,161,757 A * | 11/1992 | Large | ............ | B64C 9/18 |
| | | | | 244/213 |
| 5,788,190 A * | 8/1998 | Siers | ............ | B64C 9/16 |
| | | | | 244/212 |
| 7,051,982 B1 * | 5/2006 | Johnson | ............ | B64C 9/02 |
| | | | | 244/129.1 |
| 2008/0169383 A1 * | 7/2008 | Patzelt | ............ | B64C 3/50 |
| | | | | 244/216 |

* cited by examiner

AIRFOIL FLAP ASSEMBLY WITH SPLIT FLAP TRACK FAIRING SYSTEM

FIELD

The present invention is related generally to aircraft having airfoils with extendable flaps and associated flap operating mechanisms. In preferred embodiments, the present invention is related to flap track fairing systems employed with the flap operating mechanisms of the extendable flaps. The fairing systems as described herein can be incorporated with virtually any airfoil having a moveable (e.g., Fowler-type) flap but is particularly well suited for use with swept wing aircraft.

BACKGROUND

When a Fowler-type motion associated with flap extension is desired (i.e., rearward and rotational downward flap movement), most of the low-weight flap deployment mechanisms need to cross the aerodynamic shape of the clean wing configuration. These flap mechanisms do not have an aerodynamically friendly shape and thus the mechanisms induce drag forces when exposed to the airflow (especially during cruise flight phase). It is therefore typical for fairings to be provided so as to house the flap operating mechanisms (conventionally termed "flap track fairings"). Flap track fairings have two main functions, that is (1) to reduce the drag that would be caused by the flap deployment mechanism exposed to the airflow during the cruise flight phase (e.g., by smoothing the change in cross-sectional area of the mechanism), and (2) to protect the mechanism thus reducing the probability of hazardous events that may preclude deployment when needed. The flap track fairing must be provided with minimal profile so as to be more aerodynamically clean thereby promoting more economical (lower) fuel burn for the aircraft and improving the lift force during take-off and landing.

A flap track fairing needs to be designed such that it absorbs the movement of the flap deployment mechanism by avoiding structural interference during the flap extension/retraction cycle. Aircraft with swept wings commonly have a flap mechanism that is not aligned with the airstream such that there is some lateral travel of the deployment mechanism's movable components relative to the oncoming airstream that occurs with the flap extension. The outcome of such a scenario is usually addressed by designing a pivoted flap track fairing such that the lateral travel of the deployment mechanism's movable components is confined within the width of the flap track fairing. When appropriately designed and sealed, such a flap track fairing solution has the benefit of providing more efficient fuel burn as well as generating low ambient noise during the approach and landing flight phase when flaps are deployed.

Although, both the fuel burn benefit and the wing flap lift force efficiency of the conventional pivoted flap track fairing is limited by the width of the flap track fairing, it follows that, because of the restriction of a minimum width that will accommodate the lateral travel of the deployment mechanism's movable components, an increase in the flap track fairing frontal profile thickness is necessary thereby producing more drag force and more detached flow area on the suction side of the wing flap. The embodiments disclosed herein overcome the fuel burn benefit limitation and recovery of effective wing flap area that are found in conventional systems thereby making it possible for flap track fairings to have a relatively thinner frontal profile as compared to conventional proposals.

SUMMARY

The embodiments of the present invention as described herein will generally comprise a flap track fairing system which is split into a forward immovably fixed portion and an aft movable portion. The fixed forward portion is immovably attached to the main wing structure while the movable aft portion is attached either to the movable components of the flap deployment mechanism or to the lower surface of the flap. A separation line between the forward movable portion and the aft fixed portion is provided such that the movable portion does not interfere structurally with the flap fairing structure during a flap extension/retraction cycle.

By attaching the aft movable portion of the flap track fairing either to the deployment mechanism's movable components or to the flap lower surface, the movable portion of the flap track fairing will travel laterally together with the deployment mechanism as soon as the flap is extended. Thus, as compared to conventional systems having a forward hinged fairing portion, a thinner flap track fairing can be obtained according to the embodiments disclosed herein while still avoiding clash issues during flap extension/retraction cycles. By way of example, for a typical aircraft using the flap track fairing system as described herein, a reduction of 10% up to 20% of the flap track fairing frontal area can be realized. During cruise flight phase of an aircraft equipped with eight flap track fairings, a reduction between 1.6 and 3.1 drag can be significant. For a typical commercial aircraft, this means a share ranging from 0.4% up to 1% of the total drag while in a cruise condition.

The movable aft portion of the flap fairing includes flow deflectors installed at the separation border with the fixed forward portion. When the flap is extended, the deflectors have the function of deflecting the airflow away from the cavity opening that would otherwise be presented. The deflectors therefore ensure acceptable ambient aerodynamic noise generation that may ensue from the airflow entering the cavity while also reducing the possibility that the movable aft portion of the fairing may physically separate from the flap structure (i.e., a reduced "blow-out" risk). The flow deflectors are most preferably provided so as to project inwardly towards the interior of the flap track fairing such that during cruise configuration they are not exposed to the airflow but instead are housed completely within the flap fairing. Thus, the deflectors do not contribute to extra drag arising by use of the fairing systems as described herein.

According to some embodiments, a flap assembly for an airfoil is provided which includes a flap, a flap operating mechanism operably connected to the flap for moving the flap between a retracted configuration and a deployed configuration wherein the flap is positioned rearwardly and downwardly relative to the airfoil, and a flap track fairing having an interior space for housing the flap operating mechanism. The flap track fairing may include (i) a forward fairing portion immovably fixed to the airfoil, (ii) an aft fairing portion which is connected to the flap so as to be movable downwardly and laterally relative to the forward fairing portion in response to the flap being moved between the retracted and deployed configurations thereof, and (iii) a primary airflow deflector positioned near a forward separation edge of the aft fairing portion. The airflow deflector will therefore be housed within the interior space of the flap track fairing when the flap is in the retracted configuration thereof and being positioned within a gap defined between the forward edge of the aft fairing portion and a rearward edge of the forward fairing portion when the flap is in the deployed configuration thereof to thereby deflect airflow away from the interior space of the fairing.

The flap assembly may also include a secondary airflow deflector. If present, the primary airflow deflector may be positioned along an upper region of the forward separation edge, and the secondary airflow deflector may positioned along a lower region of the forward separation edge. According to preferred embodiments, the primary airflow deflector is slanted inwardly towards the interior space of the flap track fairing.

A variety of wing flap configurations may beneficially be provided with the flap assemblies and flap track fairings as described herein. For example, the wing flap may be a single slotted flap or may be a single flap which includes a fixed vane. The embodiments here are especially usefully employed with wing flaps having Fowler flap motion. The embodiments herein described are also especially usefully employed on aircraft with swept wings (i.e., wings which are angled either rearwardly or forwardly relative to the flight direction of the aircraft).

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

Figure 1:
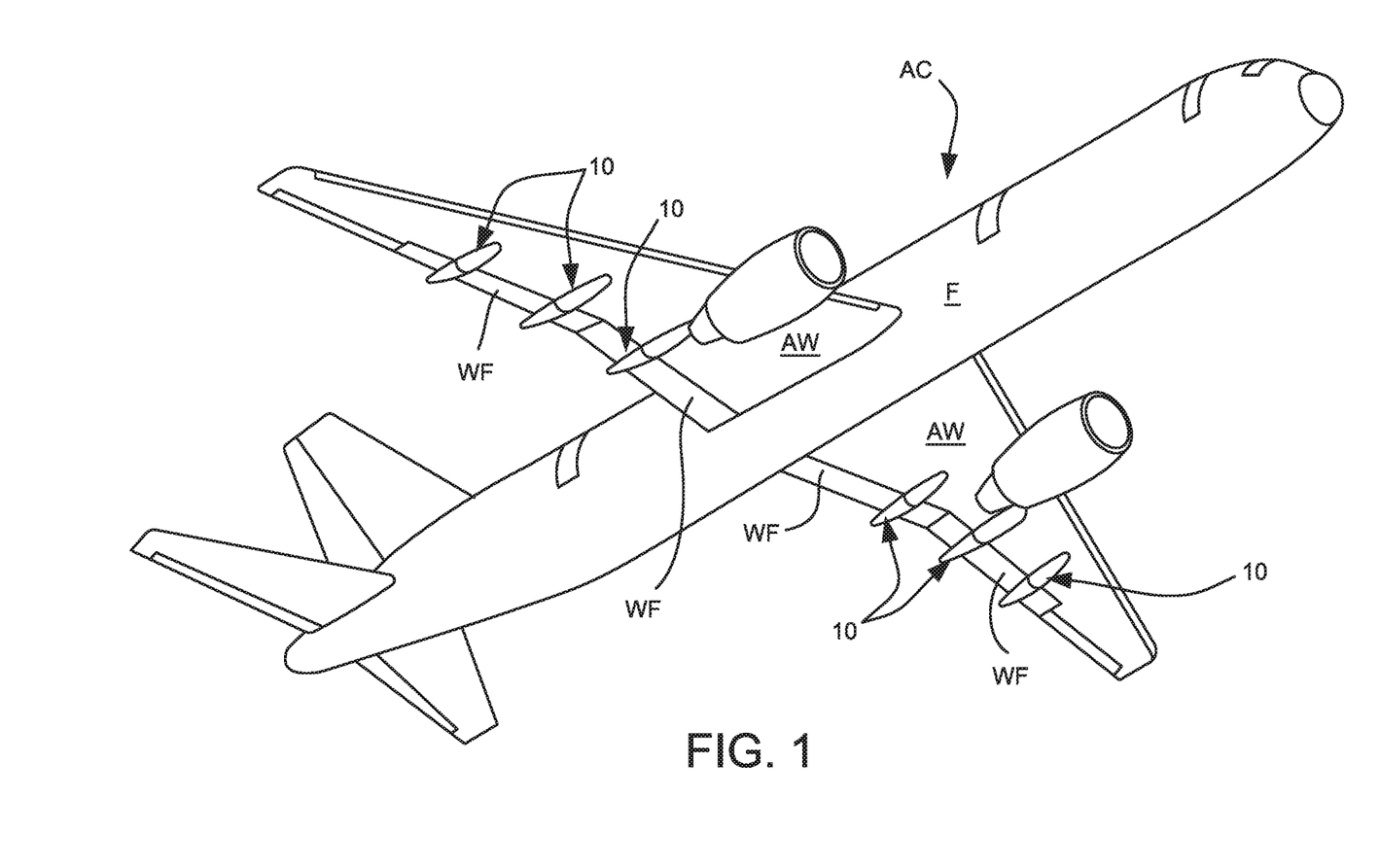
FIG. 1 is a schematic perspective of an aircraft as viewed from below with multiple flap fairing systems of the present invention.

Accompanying FIG. 1 schematically depicts a commercial transport category aircraft AC having a fuselage F with starboard and port aircraft wings AW. Each of the wings AW is provided with a series of wing flaps WF that may be retracted during cruise flight (i.e., as shown in FIG. 1) or deployed during an approach/landing configuration. Actuation of the wing flaps is accomplished by flap mechanisms (not shown in FIG. 1) that are enclosed entirely within the wing flap fairing systems 10 in accordance with an embodiment of this invention to be described in greater detail below.

As shown in FIGS. 2A-2B and 3A-3B, the wing flap WF is provided with a wing flap operating mechanism (a portion of which is visible in FIGS. 2A and 3A and generally depicted by reference numeral 20) are housed within the fairing system 10. The flap operating mechanism 20 may generally include a flap support structure 22 which is connected to the wing flap WF by way of a flap mount 24 and connection rod(s) 26a, 26b. It will be understood that the depiction of the flap operating mechanism 20 is exemplary only and thus the embodiments of the invention disclosed herein are not limited by the quantity or type of connecting links.

The fairing system 10 includes a forward fairing portion 10-1 which is immovably fixed to the wing AW and a movable aft fairing portion 10-2. The forward and rearward fairing portions 10-1 and 10-2, respectively, are separable from one another along a parting line 30 defined by a rearward edge 30b of the forward fairing portion 10-1 and a forward edge 30a of the aft fairing portion 10-2 (see FIG. 3A).

Figure 2A:
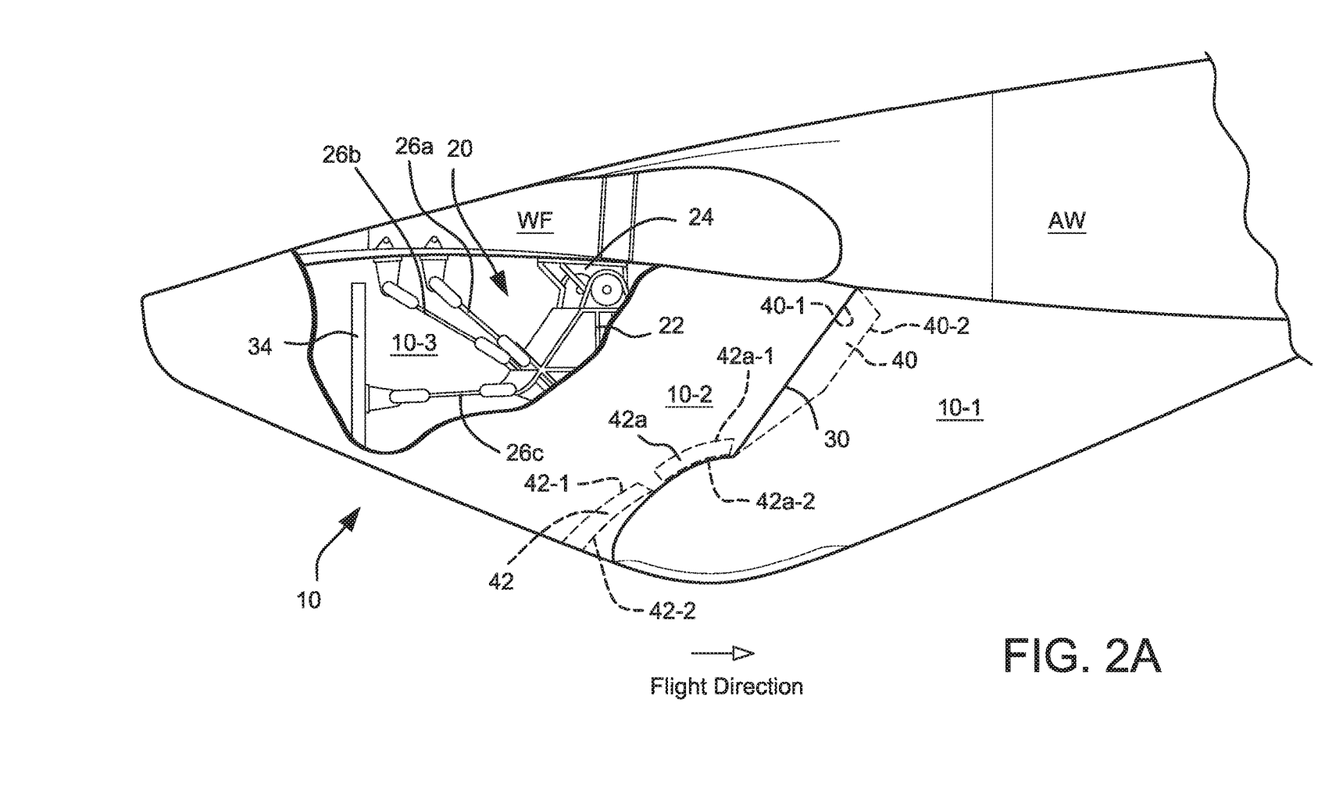
FIG. 2A is a lateral partially exposed elevational view of a flap track fairing system of the invention employed on a single slotted flap during cruise configuration.
Figure 2B:
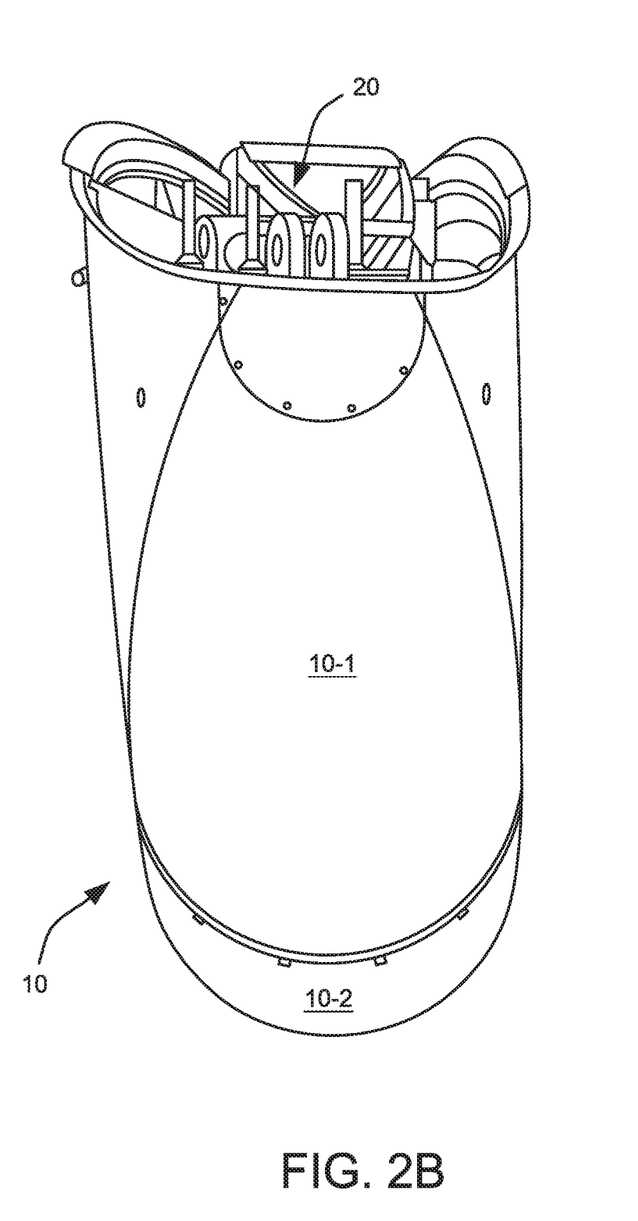
FIG. 2B is a front view of the flap track fairing system shown in FIG. 2A as viewed in a direction opposite to the flight direction of the aircraft.
Figure 3A:
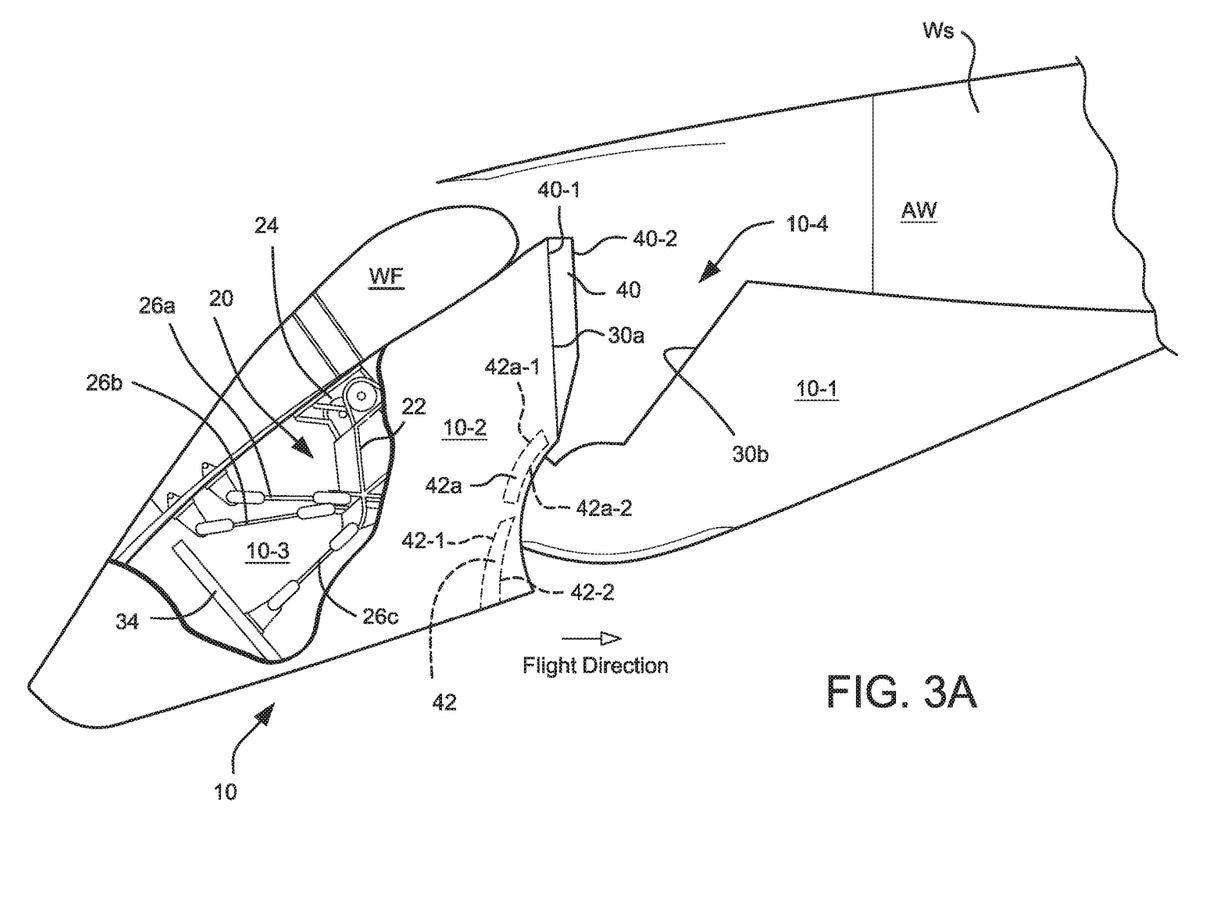
FIG. 3A is a lateral partially exposed elevation view of the flap track fairing system as shown in FIG. 2A but depicted in an approach (flap deployed) configuration.
Figure 3B:
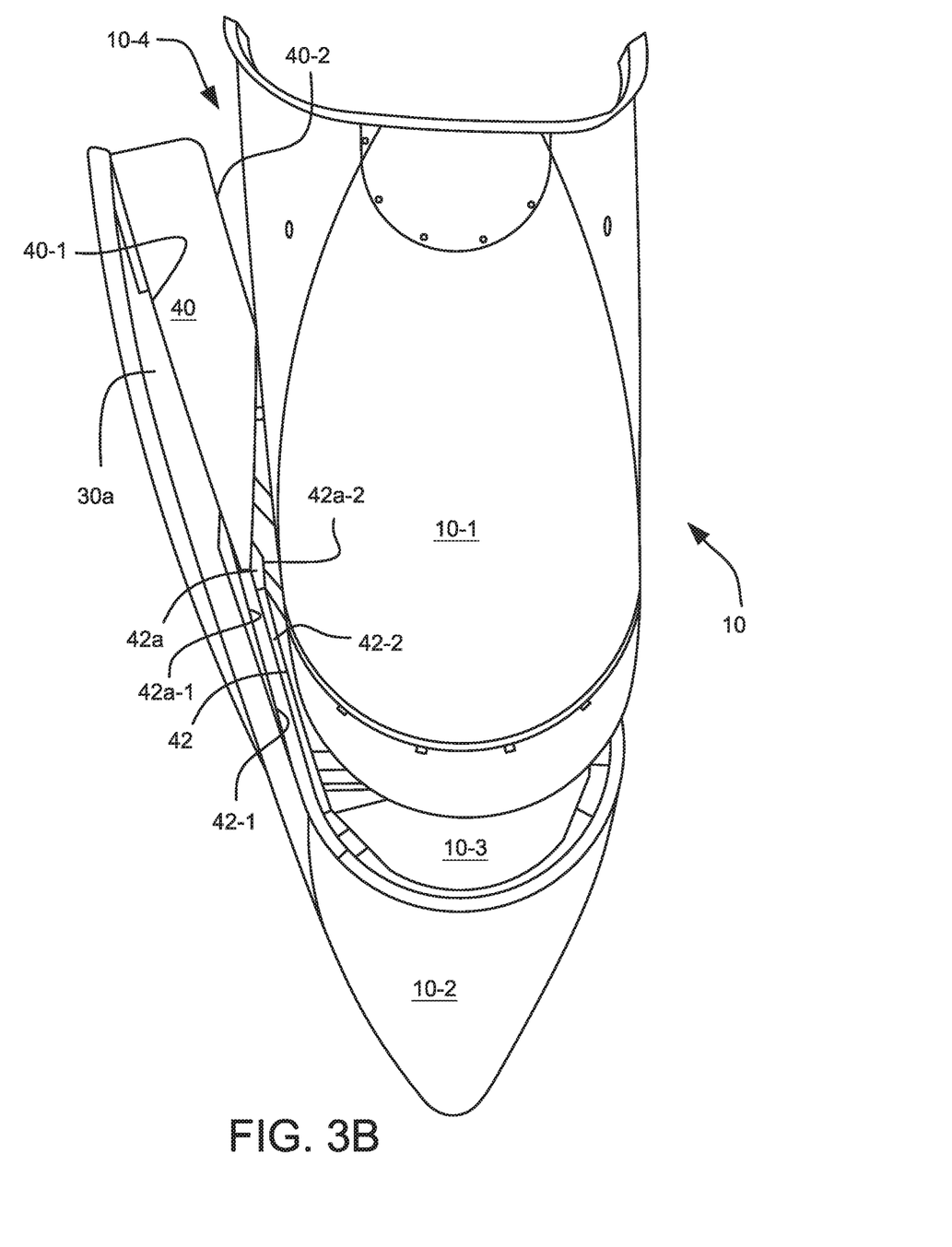
FIG. 3B is a front view of the flap track fairing system shown in FIG. 3A as viewed in a direction opposite to the flight direction of the aircraft.

The flap support structure 22 of the flap operating mechanism 20 is generally attached to a mounting plate 34 positioned within the movable aft fairing portion 10-2 by means of connection rod 26c. In such a manner, therefore, the movable aft flap fairing portion 10-2 is fixed to the wing flap WF. As such, movement of the wing flap WF from its retracted configuration as shown in FIG. 2A into its deployed configuration as shown in FIG. 3A will likewise cause the movable aft fairing portion 10-2 to be concurrently deployed relative to the fixed forward fairing portion 10-1.

Important to the embodiments disclosed herein, the movable aft fairing portion 10-2 includes a primary (upper) deflector blade 40 extending along the forward edge 30a thereof. The deflector blade 40 has an outer fixed edge 40-1 which is fixed to the forward edge 30a of the movable aft fairing portion 10-2 and an opposed inner free edge 40-2 which is structurally unconnected to fairing 10. The deflector blade 40 is slanted inwardly towards the interior cavity space 10-3 defined by the flap track fairing 10 from the outer edge 40-1 to the inner edge 40-2. Upon deployment of the wing flap WF, therefore, the movable aft fairing portion 10-2 will be displaced downwardly and laterally relative to the immovably fixed fairing portion 10-1. Such movement of the aft flap fairing portion 10-2 downwardly and laterally relative to the fixed forward fairing portion 10-1 upon deployment of the wing flap WF by the flap operating mechanism 20 will thereby expose a fairing gap 10-4 to the oncoming airstream flow between the forward edge 30a of the aft fairing portion 10-2 and the rearward edge 30b of the forward fairing portion 10-1 (see FIGS. 3A and 3B). The deflector blade 40 will thus be positioned within such defined fairing gap 10-4 to thereby essentially deflect airflow away from the interior cavity space 10-3 of the fairing 10.

In a similar manner, one or more secondary (lower) deflector blades 42, 42a may be provided at a lower region of the separation edge 30a. Like the deflector blade 40 discussed above, the secondary deflector blade 42 and, if present, the secondary deflector blade 42a, include(s) an outer fixed edge 42-1, 42a-1, respectively, fixed to the movable aft fairing portion 10-2 and an inner free edge 42-2, 42a-2, respectively, which is structurally unconnected to the movable aft fairing portion 10-2 and extends into the interior cavity space 10-3. In addition, the secondary deflector blade 42 and, if present, the secondary deflector blade 42a is(are) slanted inwardly towards the interior cavity space 10-3 defined by the wing flap fairing 10. Upon deployment of the wing flap WF, the deflector blade(s) 42, 42a will thus deflect oncoming airflow away from the interior cavity space 10-3 of the fairing 10 at a lower region of the fairing 10.

Figure 4:
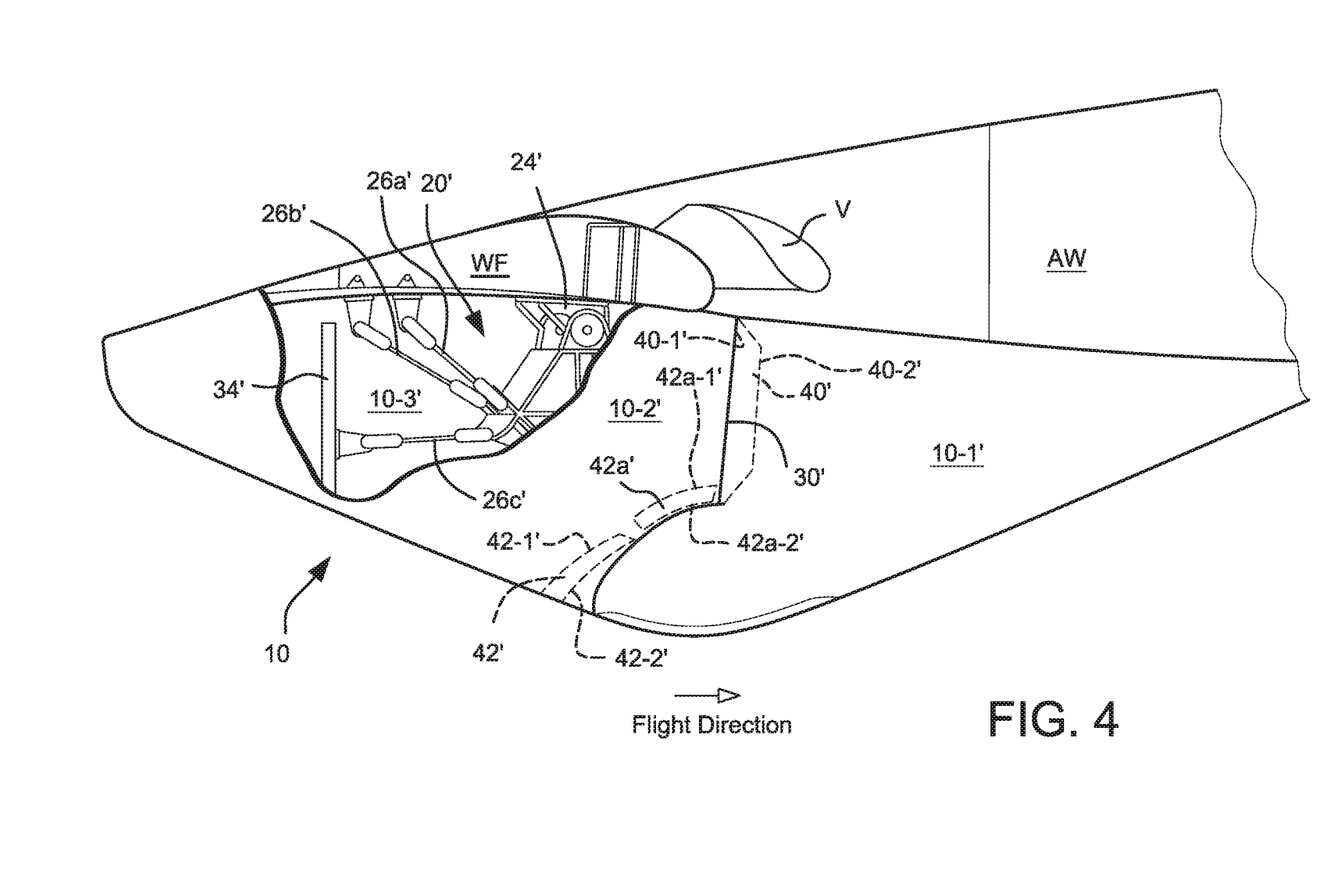
FIG. 4 is a lateral partially exposed elevational view of a flap track fairing system of the invention employed on a single flap with a fixed vane during cruise configuration.
Figure 5:
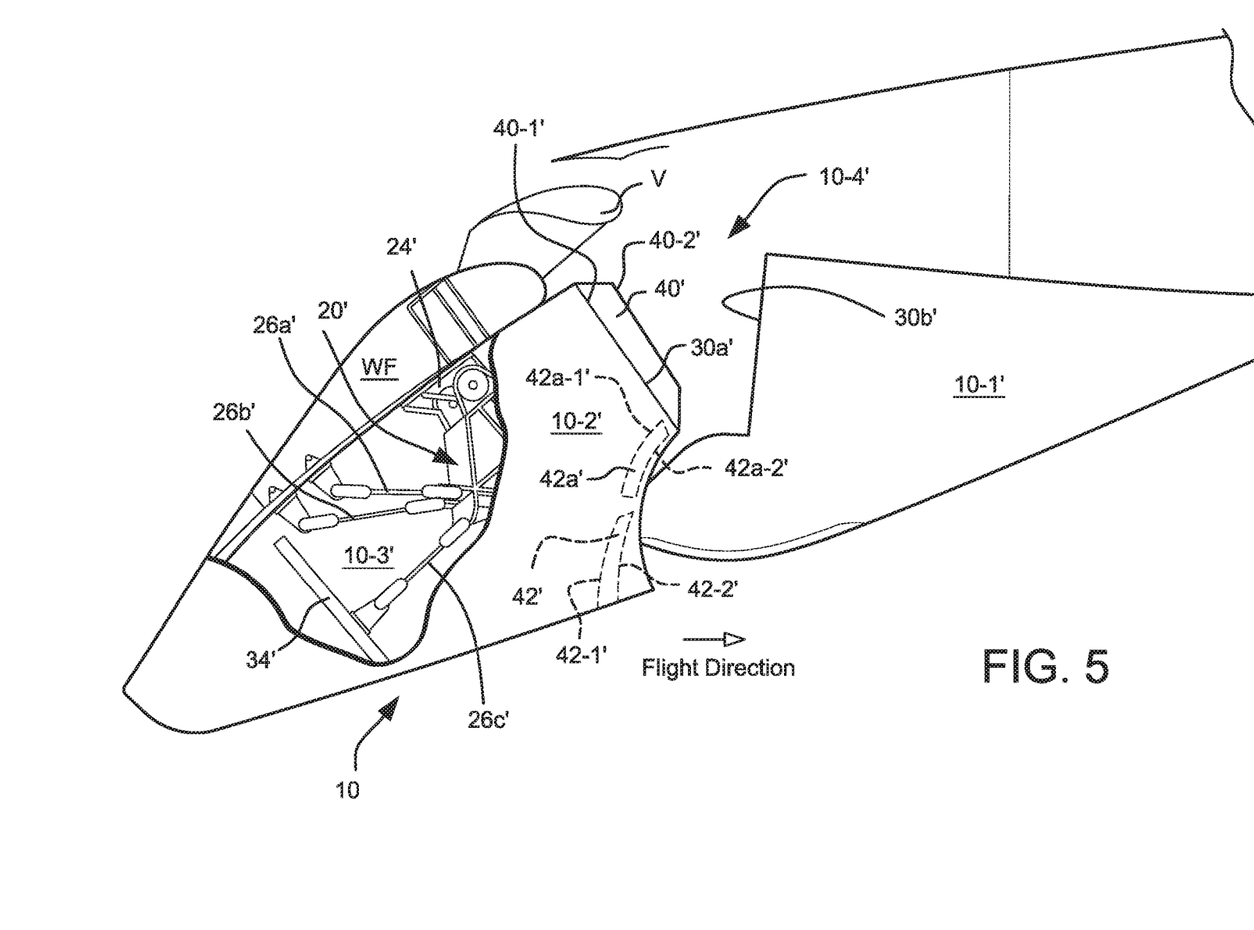
FIG. 5 is a lateral partially exposed elevation view of the flap track fairing system as shown in FIG. 4 but depicted in an approach (flap deployed) configuration.

FIGS. 4 and 5 depict retracted and deployed conditions of a wing flap WF provided with a fixed vane V and having a flap track fairing 10'. The structures and functions of such structures associated with the flap track fairing 10' are similar to those of the flap track fairing 10 as described previously. As such, the structures associated with the fairing 10' have been designated by the same reference numerals as with the fairing 10 but include a prime (') designator. The discussion above with respect to the fairing 10 is therefore equally applicable to the fairing 10'.

The embodiments of the present invention may therefore be applied to any aircraft equipped with a flap which is connected to the main wing element by a deployment mechanism able to deploy the flap from a retracted position to an extended position downwardly and rearwardly (with Fowler motion). The applicability of the disclosed embodiments is especially beneficial with, but not restricted to, aircraft with swept wings.

Thus, the invention herein is not to be limited to the disclosed embodiment, but on the contrary, is intended to cover various modifications and equivalent arrangements included within the spirit and scope of the appended claims.

What is claimed is:

1. A flap assembly for an airfoil comprising:
   a flap;
   a flap operating mechanism operably connected to the flap for moving the flap between a retracted configuration and a deployed configuration wherein the flap is positioned rearwardly and downwardly relative to the airfoil; and
   a flap track fairing having an interior cavity space for housing the flap operating mechanism, wherein the flap track fairing comprises,
   (i) a forward fairing portion having an aft separation edge and being immovably fixed to the airfoil;
   (ii) an aft fairing portion having a forward separation edge and being connected to the flap so as to be movable downwardly and laterally relative to the forward fairing portion in response to the flap being moved between the retracted and deployed configurations thereof; and
   (iii) a primary airflow deflector blade positioned along the forward separation edge of the aft fairing portion, wherein the primary airflow deflector blade includes:
   an outer fixed edge which is fixed to the forward separation edge of the aft fairing portion, and
   an inner free edge which is unconnected to the aft fairing portion, wherein
   the primary airflow deflector blade is slanted inwardly towards the interior cavity space of the flap track fairing between the outer fixed edge and the inner free edge thereof, and wherein
   the primary airflow deflector blade is housed within the interior cavity space of the flap track fairing when the flap is in the retracted configuration thereof and is positioned within a fairing gap defined between the forward and rearward separation edges of the aft and forward fairing portions, respectively, when the flap is in the deployed configuration thereof to thereby deflect airflow away from the interior cavity space of the fairing.

2. The flap assembly as in claim 1, further comprising at least one secondary airflow deflector blade, wherein the primary airflow deflector blade is positioned along an upper region of the forward separation edge, and the at least one secondary airflow deflector blade is positioned along a lower region of the forward separation edge.

3. The flap assembly as in claim 2, further comprising a plurality of the secondary airflow deflector blades positioned along the forward separation edge of the aft fairing portion.

4. The flap assembly as in claim 1, wherein the flap is a single slotted flap.

5. The flap assembly as in claim 1, wherein the flap is comprised of a single flap having an upper flap surface and a vane fixed to the single flap so as to be in operative association with the upper surface thereof.

6. An aircraft which comprises:
   a fuselage,
   a pair of wings extending from the fuselage, and
   a plurality of wing flaps operatively associated with each wing, wherein
   each wing flap comprises a flap assembly in accordance with claim 1.

7. The aircraft as in claim 6, further comprising at least one secondary airflow deflector blade, wherein the primary airflow deflector blade is positioned along an upper region of the forward separation edge, and the at least one secondary airflow deflector blade is positioned along a lower region of the forward separation edge.

8. The aircraft as in claim 7, further comprising a plurality of the secondary airflow deflector blades positioned along the forward separation edge.

9. The aircraft as in claim 6, wherein each wing flap is a single slotted flap.

10. The aircraft as in claim 6, wherein each wing flap is comprised of a single flap having an upper flap surface and a vane fixed to the single flap so as to be in operative association with the upper surface thereof.

11. The aircraft as in claim 6, wherein the wings are swept wings which are angled either rearwardly or forwardly relative to the aircraft fuselage.

12. A flap assembly for an airfoil comprising:
    a flap;
    a flap operating mechanism operably connected to the flap for moving the flap between a retracted configuration and a deployed configuration wherein the flap is positioned rearwardly and downwardly relative to the airfoil; and
    a flap track fairing having an interior cavity space for housing the flap operating mechanism, wherein the flap track fairing comprises:
    (i) a forward fairing portion having an aft separation edge and being immovably fixed to the airfoil;
    (ii) an aft fairing portion having a forward separation edge and being connected to the flap so as to be movable downwardly and laterally relative to the forward fairing portion in response to the flap being moved between the retracted and deployed configurations thereof; and
    (iii) a primary airflow deflector blade positioned along an upper region of the forward separation edge of the aft fairing portion, and
    (iv) a secondary airflow deflector blade positioned along a lower region of the forward separation edge of the aft fairing portion, the primary and secondary airflow deflector blades being housed within the interior space of the flap track fairing when the flap is in the retracted configuration thereof and are positioned within a fairing gap defined between the forward and rearward separation edges of the aft and forward fairing portions, respectively, when the flap is in the deployed configuration thereof to thereby deflect airflow away from the interior cavity space of the fairing.

13. The flap assembly as in claim 12, further comprising a plurality of the secondary airflow deflector blades positioned along the forward separation edge of the aft fairing portion.

14. The flap assembly as in claim 12, wherein the primary airflow deflector blade is slanted inwardly towards the interior space of the flap track fairing.

15. The flap assembly as in claim 12, wherein the flap is a single slotted flap.

16. The flap assembly as in claim 12, wherein the flap is comprised of a single flap having an upper flap surface and a vane fixed to the single flap so as to be in operative association with the upper surface thereof.

17. An aircraft which comprises:
a fuselage;
a pair of wings extending from the fuselage; and
a plurality of wing flaps operatively associated with each wing;
wherein each wing flap comprises a flap assembly in accordance with claim 12.

18. The aircraft as in claim 17, wherein the primary airflow deflector is slanted inwardly towards the interior space of the flap track fairing.

19. The aircraft as in claim 17, wherein each wing flap is a single slotted flap.

20. The aircraft as in claim 17, wherein each wing flap is comprised of a single flap having an upper flap surface and a vane fixed to the single flap so as to be in operative association with the upper surface thereof.

21. The aircraft as in claim 17, wherein the wings are swept wings which are angled either rearwardly or forwardly relative to the aircraft fuselage.

* * * * *